(12) United States Patent
Helms et al.

(10) Patent No.: US 10,915,547 B2
(45) Date of Patent: *Feb. 9, 2021

(54) OPTIMIZING DATA CONVERSION USING PATTERN FREQUENCY

(71) Applicant: International Business Machines Corporation, Armonk, NY (US)

(72) Inventors: Markus M. Helms, Boeblingen (DE); Christian Jacobi, Poughkeepsie, NY (US); Aditya N. Puranik, Pune (IN); Parminder Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,499

(22) Filed: Aug. 9, 2019

(65) Prior Publication Data

US 2019/0361909 A1 Nov. 28, 2019

Related U.S. Application Data

(63) Continuation of application No. 14/931,116, filed on Nov. 3, 2015, now Pat. No. 10,417,252, which is a continuation of application No. 14/533,265, filed on Nov. 5, 2014.

(51) Int. Cl.
  *G06F 16/00* (2019.01)
  *G06F 16/25* (2019.01)
(52) U.S. Cl.
  CPC .................. *G06F 16/258* (2019.01)
(58) Field of Classification Search
  CPC .......................... G06F 16/358; G06F 16/258
  See application file for complete search history.

(56) References Cited

U.S. PATENT DOCUMENTS

| | | |
|---|---|---|
| 5,611,062 A | 3/1997 | Webb |
| 6,247,113 B1 | 6/2001 | Jaggar |
| 7,218,252 B2 | 5/2007 | Fauque |
| 7,266,026 B2 | 9/2007 | Gongwer |
| 7,400,271 B2 | 7/2008 | Cameron |
| 7,421,694 B2 | 9/2008 | Gosalia |
| 7,500,083 B2 | 3/2009 | Trivedi |
| 7,577,936 B2 | 8/2009 | Koseki |

(Continued)

FOREIGN PATENT DOCUMENTS

WO 2014035539 A1 3/2014

OTHER PUBLICATIONS

Bob Rodgers, The What and Why of zEnterprise Millicode, IBM Systems Magazine (Year: 2012).

(Continued)

*Primary Examiner* — Grace Park
(74) *Attorney, Agent, or Firm* — Christopher M. Pignato (57) ABSTRACT

Embodiments of the present invention provide systems and methods for increasing the efficiency of data conversion in a coprocessor by using the statistical occurrence of data patterns to convert frequently occurring data patterns in one conversion cycle. In one embodiment, a coprocessor system is disclosed containing a converter engine, which includes a parser and a converter, an input buffer, and a result store. The input buffer is configured to transfer a set of source data to the converter engine, which converts the source data from first code format to a second code format, and sends the converted source data to the result store.

15 Claims, 5 Drawing Sheets

(56) References Cited

U.S. PATENT DOCUMENTS

| | | |
|---|---|---|
| 7,750,828 B2 | 7/2010 | Nakagawa |
| 7,898,441 B2 | 3/2011 | Cameron |
| 10,417,252 B2 | 9/2019 | Helms |
| 2008/0033974 A1 | 2/2008 | Cameron |
| 2008/0127122 A1 | 5/2008 | Greiner |
| 2009/0323383 A1 | 12/2009 | Mondaeev |
| 2012/0158701 A1 | 6/2012 | Otsuka |
| 2012/0254210 A1 | 10/2012 | Dhulipala |
| 2013/0132353 A1 | 5/2013 | Mande |
| 2014/0266818 A1 | 9/2014 | Laviolette |
| 2016/0124732 A1 | 5/2016 | Helms |
| 2016/0125055 A1 | 5/2016 | Helms |

OTHER PUBLICATIONS

Bob Rodgers, What and Why of System z Millicode, SHARE in Anahein (Year: 2012).

Cameron, Robert D., "u8u16—A High-Speed UTF-8 to UTF-16 Transcoder Using Parallel Bit Streams", Technical Report 2007-18, School of Computing Science, Simon Fraser University, pp. 1-46, Jun. 21, 2007.

L.C. Heller and M.S. Farrell, Millicode in an IBM zSeries processor, IBM (Year: 2004).

Appendix P—List of IBM Patents or Patent Applications Treated as Related, Filed herewith, 2 Pages.

OPTIMIZING DATA CONVERSION USING PATTERN FREQUENCY

BACKGROUND OF THE INVENTION

The present invention relates generally to the field of data conversion, and more particularly to the optimized conversion of data in a coprocessor using the frequency of occurrence of data patterns.

Unicode Transformation Format (UTF) is a computation industry standard for representing text in binary code points, using variable-width code points, ranging from one to four bytes. UTF-8 is an 8-bit variable-width code and is a common format for encoding web pages, among other text. UTF may also be encoded in a 16-bit variable-width code (UTF-16) and a 32-bit fixed width code (UTF-32). Data written in one encoding width format may subsequently be converted to a second encoding width format.

SUMMARY

According to one embodiment of the present invention, a coprocessor is provided, the coprocessor comprising: a converter engine, wherein the converter engine comprises a parser and a converter; and wherein the converter engine is configured to convert a first set of source data in a first code format to a second code format; an input buffer, wherein the input buffer is configured to transfer the first set of source data; and a result store, wherein the result store is configured to receive a converted first set of source data from the converter engine.

According to another embodiment of the present invention, a method is provided, the method comprising: determining a plurality of byte sequence patterns, wherein the plurality of byte sequence patterns represents data in a first code format; receiving, by a coprocessor, a first set of source data in a first code format; reading, by the coprocessor, the first set of source data in the first code format into a queue; determining, by the coprocessor, a sliding window of the first set of source data in the first code format; determining, by the coprocessor, a shift amount from the first set of source data using pattern matching; and converting, by the coprocessor, the shift amount from the first set of source data in the first code format to a second code format.

DETAILED DESCRIPTION

UTF encoding can represent many text characters across multiple different languages. The text characters are represented as UTF symbols, with each symbol varying in length from one to four bytes long. As there are numerous text characters to support, the number of combinations of input symbols may also be very large. Some converters are designed to handle each input pattern as the pattern is converted, which may lead to a high amount of power consumption, as well as a reduction in throughput during data conversion. Embodiments of the present invention provide systems and methods for increasing the efficiency of data conversion in a coprocessor by using the statistical occurrence of data patterns to convert frequently occurring data patterns in one conversion cycle.

Figure 1:
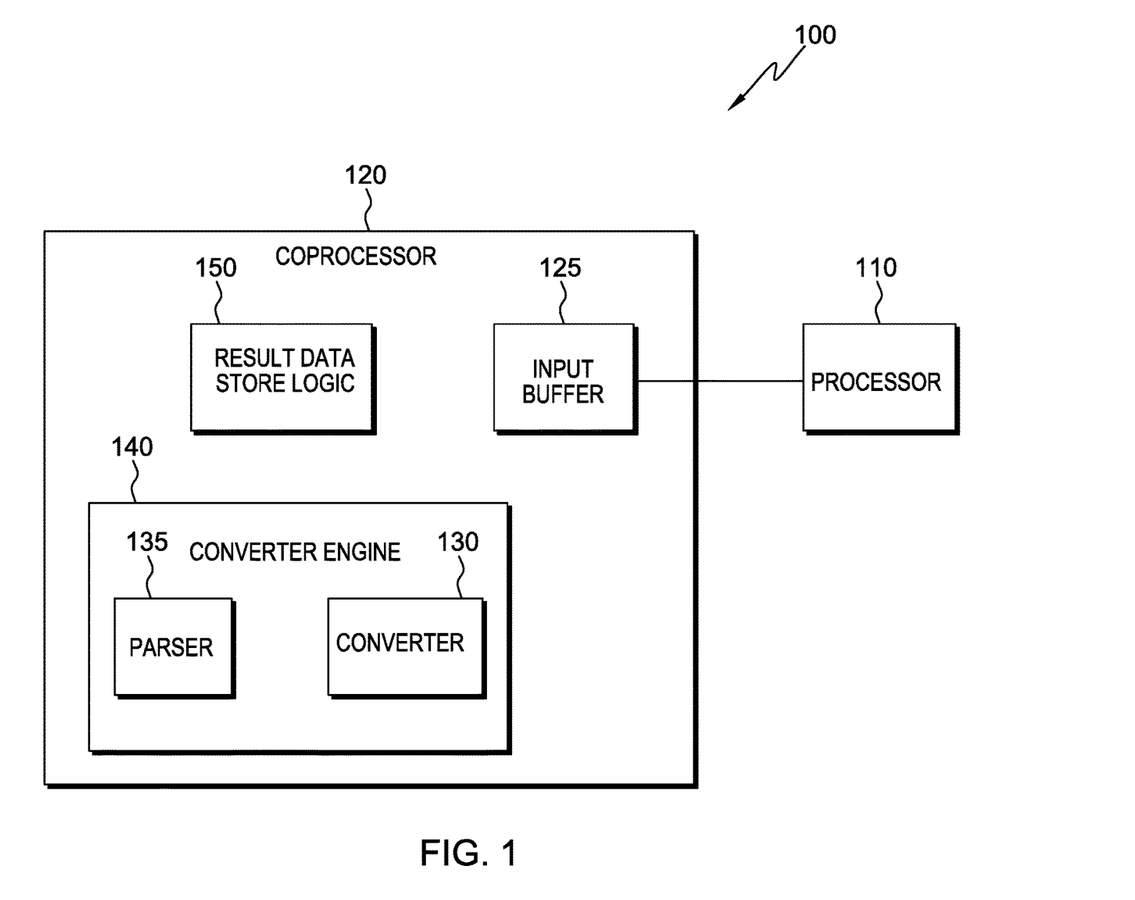
FIG. 1 is a functional block diagram illustrating an environment, in accordance with an embodiment of the present invention.

The present invention will now be described in detail with reference to the Figures. FIG. 1 is a functional block diagram illustrating an environment, generally designated 100, in accordance with one embodiment of the present invention. Modifications to environment 100 may be made by those skilled in the art without departing from the scope of the invention as recited by the claims. In an exemplary embodiment, environment 100 includes processor 110 and coprocessor 120.

Processor 110 is hardware within environment 100 which executes programs and communicates with coprocessor 120. In this exemplary embodiment, processor 110 communicates with coprocessor 120 via millicode instructions. Millicode is located in the main memory (not shown in FIG. 1), and loaded as an instruction stream into processor 110. Millicode instructions are communicated to coprocessor 120 by writing to hardware registers located in coprocessor 120.

Coprocessor 120 includes input buffer 125, converter engine 140, and result data store logic 150. Coprocessor 120 is a processor used to supplement the functions of processor 110. In this exemplary embodiment, coprocessor 120 receives input information through millicode, which copies source data from the main memory of processor 110 to input buffer 125 via register writes. Coprocessor 120 sends results information via result data store logic 150 directly into the main memory. Coprocessor 120 can provide status register information via a register read interface. Coprocessor 120 is capable of handling complex algorithms, encryption and decryption, hashing, compression, and data conversion. Coprocessor 120 is controlled by millicode and is capable of implementing algorithms directly in the hardware. In this exemplary embodiment, the source data input is sent by millicode from the main memory in processor 110. Millicode and firmware both control instructions sent to the hardware.

Input buffer 125 is a hardware array, such as a register file, which temporarily stores millicode instructions. Input buffer 125 may be, for example, static random access memory (SRAM). Input buffer 125 is capable of acting as a means for source data transfer. Input buffer 125 receives source data sent by the millicode from the main memory and communicates, via a status register, the amount of free space in input buffer 125, to the millicode. Input buffer 125 is capable of receiving millicode instructions independent from converter engine 140 reading from the input buffer.

Converter engine 140 is a hardware module, including converter 130 and parser 135. Converter 130 is conversion hardware in the coprocessor architecture which converts data from one code format to a second code format, according to instructions from the architecture. In this exemplary embodiment, converter 130 is capable of converting text encoded in Unicode Transformation Format (UTF). Converter 130 communicates with input buffer 125 to read data, and communicates converted data to result data store logic 150. Converter 130 communicates status information to a status register (not shown in FIG. 1), containing data such as the number of bytes converted and whether an error occurred during conversion.

Parser 135 may be designed, constructed, and/or configured to extract, parse for, infer, identify, or otherwise process a packet from a request, a response, or any content. Parser 135 may comprise hardware or any combination of software and hardware. Parser 135 may include an application, program, library, script, process, task, thread, or any type and form of executable instructions that execute on one or more processors or cores, such as processor 110 and coprocessor 120. In some embodiments, parser 135 is a universal or multi-syntax/language parser. In other embodiments, parser 135 is designed and constructed to process or analyze any one or more specific types of information. In this exemplary embodiment, parser 135 is optimized to process data encoded in UTF.

Result data store logic 150 is a coprocessor interface and includes a small result buffer. Result data store logic 150 is capable of communicating with converter engine 140. Result data store logic 150 is capable of receiving converted data from converter 130 and writing the converted data into the main memory (not shown in FIG. 1).

Figure 2:
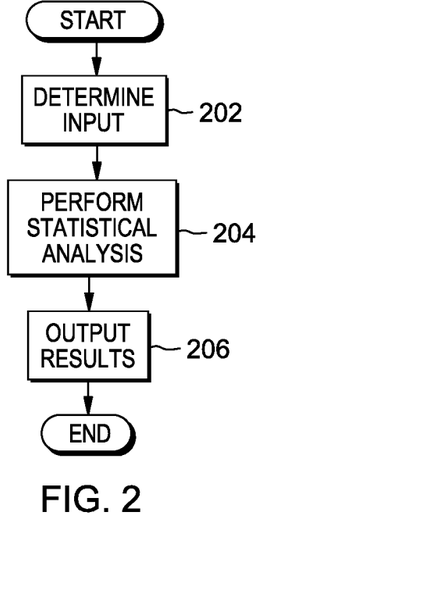
FIG. 2 is a flowchart depicting operational steps for determining the high likelihood of occurrence data patterns, in accordance with an embodiment of the present invention.

FIG. 2 is a flowchart depicting operational steps for determining the high likelihood of occurrence data patterns, in accordance with an embodiment of the present invention.

In step 202, the total number of input patterns is determined. In this exemplary embodiment, six modes of UTF conversion are supported by the hardware (i.e., UTF-8 to UTF-16; UTF-16 to UTF-8; UTF-16 to UTF-32; UTF-32 to UTF-16; UTF-8 to UTF-32; and UTF-32 to UTF-8), and a shift out of a queue at a maximum of eight bytes (i.e., nine different signals) needs to be supported. For example, the total input of data patterns is obtained using the parameters of six modes of conversion and nine different signals. In other embodiments, any number of modes of conversion and any number of signals supported by the hardware architecture may be used to determine the total number of input patterns.

In step 204, an offline statistical analysis calculation is performed, using the determined input patterns. The offline statistical analysis of input data patterns occurs once, during the design phase, and the optimized results are used to code the hardware logic of converter engine 140. In this exemplary embodiment, during the design phase, the input data patterns are analyzed and broken up into two groups: data patterns with a high likelihood of occurrence and data patterns with a low likelihood of occurrence. The likelihood of occurrence of a data pattern is based partially on factors such as the language of the input characters and the length of the input characters. Optimization is performed for both data patterns with similar lengths of the input characters and for data patterns which change in character length. The data patterns which are determined to have a high likelihood of occurrence are able to be converted in one conversion cycle. The data patterns which are determined to have a low likelihood of occurrence are broken up into multiple smaller patterns, which may be matched to one or more high likelihood of occurrence data patterns, and are converted in multiple conversion cycles.

In step 206, the resulting groupings of high and low frequency of occurrence data patterns are output. In this exemplary embodiment, the system architecture needs to only support 102 different data patterns, when supporting six modes of conversion and nine different signals (discussed further in FIGS. 5A and 5B).

Accordingly, by performing the operational steps of FIG. 2, the number of input data patterns to support is reduced, allowing a higher frequency and throughput for converter engine 140 during UTF conversion. Furthermore, the overall amount of logic and power required is reduced by minimizing the group of supported data patterns to only those with a high frequency of occurrence.

Figure 3:
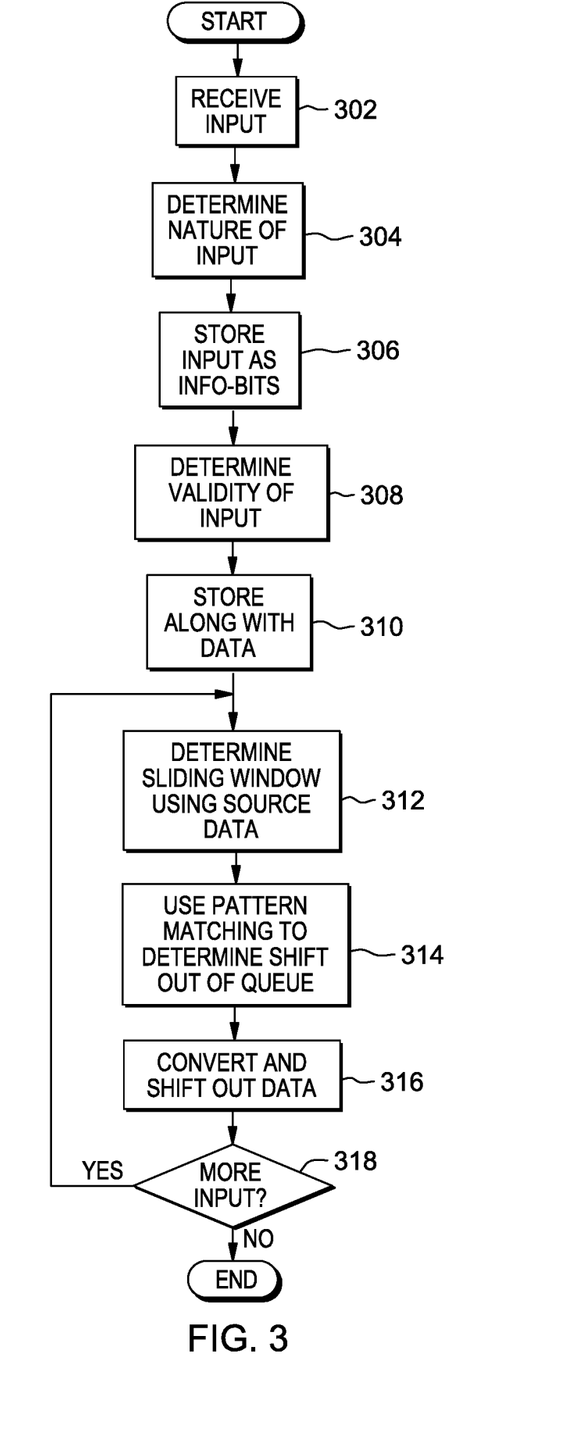
FIG. 3 is a flowchart depicting operational steps performed by components of a coprocessor during data conversion, in accordance with an embodiment of the present invention.

FIG. 3 is a flowchart depicting operational steps performed by components of coprocessor 120 during data conversion, in accordance with an embodiment of the present invention.

In step 302, coprocessor 120 receives a source input, via input buffer 125. Coprocessor 120 receives a source input from the firmware operating on processor 110. The size of the input is determined by the instruction in the stream of instructions. The millicode receives a pair of registers containing the address and size of the source input. The millicode then fetches the source data from the main memory and inputs the source data into input buffer 125. In this exemplary embodiment, the source input is a set of data encoded in one of: UTF-8, UTF-16, or UTF-32.

In step 304, logic on coprocessor 120 decodes a subset of bits to determine the nature of the source input. In this exemplary embodiment, the bit sequence of the starting (first) byte of the source input indicates the nature (character) of the source input. For example, depending on the starting byte of the data pattern of the source input, it is determined whether the source input symbol is one, two, three, or four bytes in length, or a continuation byte.

In step 306, coprocessor 120 stores the determined nature of data as one-hot info bits, or supplemental information about the source data. One-hot info bits refers to a group of bits among which the legal combinations of values are only those with a single high bit (1) and all the other are low bits (0). In this exemplary embodiment, one-hot info bits are used to convert text encoded in UTF.

In step 308, coprocessor 120 checks the validity of the source input. The validity of the byte sequence is determined by looking at the data source length. For example, by tracking the amount of incoming source data, if the incoming byte(s) are less than the source line, then the incoming byte sequence is valid. In this exemplary embodiment, coprocessor 120 checks for malformations of input characters. For example, coprocessor 120 detects byte sequences which violate the UTF specification, such as a starting byte not followed by enough continuation bytes or an overlong encoding.

In step 310, coprocessor 120 temporarily stores the determined nature and determined validity of each byte (the info-bits) of source data in the internal latches of converter engine 140. In this exemplary embodiment, the determined info bits are stored as one-hot vectors of five bits, where each of the five bits corresponds to a different character byte length. For example, a high bit (1) at bit two indicates that the character is three bytes in length. In this exemplary embodiment, the stored information data about each byte becomes the input for a 16 byte queue, which is the means for input buffer 125 to read-in source data. In other embodiments, a queue of any byte length may be implemented to read-in source data from an input buffer, which is capable of being supported by the system architecture.

In step 312, converter engine 140 determines a sliding window using a grouping of source data. The sliding window is determined using the 16 byte queue, which is loaded with the temporarily stored info-bits and the stored source data. In this exemplary embodiment, the sliding window is a grouping of eight consecutive bytes on the 16 byte queue, and starts at the bottom of the queue (depicted in further detail in FIGS. 4A and 4B). In other embodiments, the sliding window may be a grouping of any number of bytes which is supported by the byte length of the queue and the system architecture.

In step 314, parser 135 uses pattern matching on a set of symbols to determine the shift amount out of the 16 byte queue. As obtained from the operational steps of FIG. 2, a small set of the high likelihood of occurrence patterns are selected. In this exemplary embodiment, the three pattern match conditions for multiple symbol conversions per one cycle are four, three, or two symbol patterns. The source data is matched to the calculated set of high likelihood of occurrence patterns to determine the number of symbols that will be converted in one cycle (i.e., four, three, or two). In this exemplary embodiment, the optimization is coded so that the largest possible length of input, which after conversion fits into the output length, is calculated. With the high frequency patterns determined, the conversions are capable of occurring orthogonal to each other; while in other embodiments, the conversions occur in parallel. For example, coprocessor 120 first determines whether the input pattern is four symbols. If the pattern is not four symbols, coprocessor 120 next determines whether the input pattern is three symbols, and if the pattern is not three symbols, coprocessor 120 then determines whether the pattern is two symbols. Each of the three multiple symbol pattern match conditions (i.e., four, three, and two symbol patterns) have special optimized hardware. The conversion of a one symbol pattern per cycle is the default pattern match condition, and covers all the low likelihood of occurrence patterns. After it is determined whether there is a four, three, two, or one symbol pattern, the shift of the queue is set to the number of bytes of the determined symbol pattern.

In step 316, the identified symbol(s) are converted to a second UTF code format, and the source data is shifted out of the queue. In this exemplary embodiment, the conversion of text encoded in a first UTF format (UTF-8, UTF-16, or UTF-32) to a second UTF format (UTF-8, UTF-16, or UTF-32) is performed using any methods supported by the system architecture. After the first set of source data is converted, the first set of source data is shifted out of the 16 byte queue according to the set shift amount, and the remaining data in the queue is shifted to the beginning of the queue (depicted in FIGS. 4A and 4B).

In step 318, converter engine 140 performs side-logic to determine whether there is more input data from input buffer 125 to add to the 16 byte queue. If converter engine 140 determines that there is more input data, a next grouping of eight bytes are filled into the 16 byte queue from input buffer 125 (described in further detail in FIGS. 4A and 4B) and, at step 312, a new eight byte sliding window is determined. If converter engine 140 determines that there is no more source data to add to the 16 byte queue from input buffer 125, the conversion operation ends.

Accordingly, by performing the operational steps of FIG. 3, text is converted from a first UTF code format to a second UTF code format. Furthermore, by using the calculated high frequency of occurrence data patterns, converter engine 140 is capable of converting the UTF code at a high frequency of throughput while using a reduced amount of power and logic.

Figure 4A:
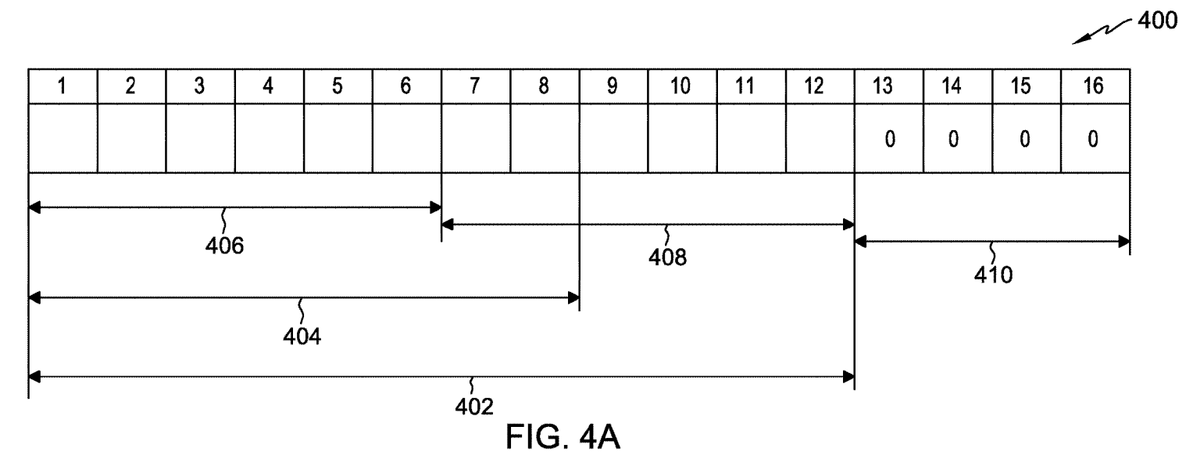
FIGS. 4A and 4B depict an example of the shift of source data in a 16 byte queue, in accordance with an embodiment of the present invention.
Figure 4B:
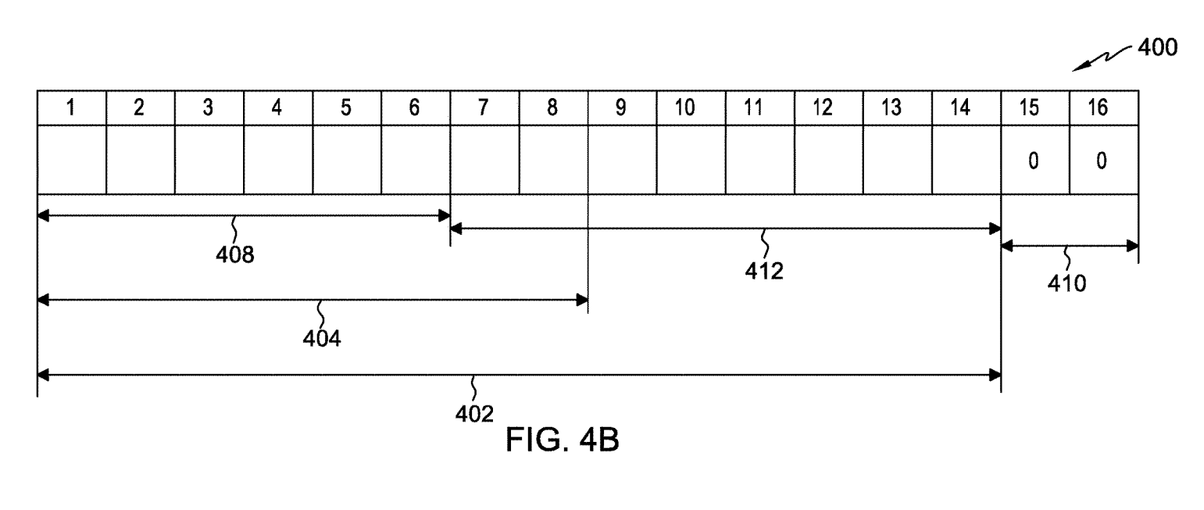

FIGS. 4A and 4B depict an example of the shift of source data in a 16 byte queue, in accordance with an embodiment of the present invention.

In FIG. 4A, queue 400 is depicted, comprising an exemplary 16 bytes. A first set of source data, valid bytes 402, are read-in to queue 400. In this exemplary embodiment, valid bytes 402 are 12 bytes in length. In other embodiments, the number of bytes which may be read-in to queue 400 may be any number of bytes supported by the hardware and resources of the system. As depicted in FIG. 4A, after valid bytes 402 are read-in to queue 400, a first set of conversion data 406 is determined from sliding window 404. Sliding window 404 is a consecutive eight byte grouping, which changes as sets of data are converted and shifted out of queue 400 (e.g., step 312 of FIG. 3). In FIG. 4A, it is determined that conversion data 406 is six bytes (determined using the pattern matching method described above at step 314 of FIG. 3); thus, the shift is six bytes. The six bytes of conversion data 406 are converted to a second data code, and shifted out of queue 400 (e.g., step 318 of FIG. 3). Leftover bytes 408 (six bytes leftover in FIG. 4A) are the number of bytes left from the total number of valid bytes 402 in queue 400 after the number of bytes of conversion data 406 have been converted and shifted out. Any bytes in queue 400 which are not filled with source data (empty area) are filled in with a zero value (empty bytes 410). As seen in FIG. 4A, the last 4 bytes (13-16) are not filled with source data, so empty bytes 410 are filled in with zero values.

FIG. 4B depicts queue 400 after conversion data 406 from FIG. 4A has been converted and shifted out. Queue 400 from FIG. 4A has been shifted to the left in FIG. 4B. The six leftover bytes 408 of FIG. 4A are now in the first six positions (1-6) of queue 400 in FIG. 4B. Queue 400 is also filled in with a new eight bytes (e.g., step 318 of FIG. 3) from input buffer 125 (input 412), making the number of valid bytes 402 in queue 400 14 bytes in FIG. 4B. As queue 400 has shifted to the left, the eight bytes that make up sliding window 404 in FIG. 4B is a different eight byte sequence than the eight bytes that make up sliding window 404 in FIG. 4A. As seen in FIG. 4B, empty bytes 410 in queue 400 (15-16 in FIG. 4B) are filled with zero values.

Figure 5A:
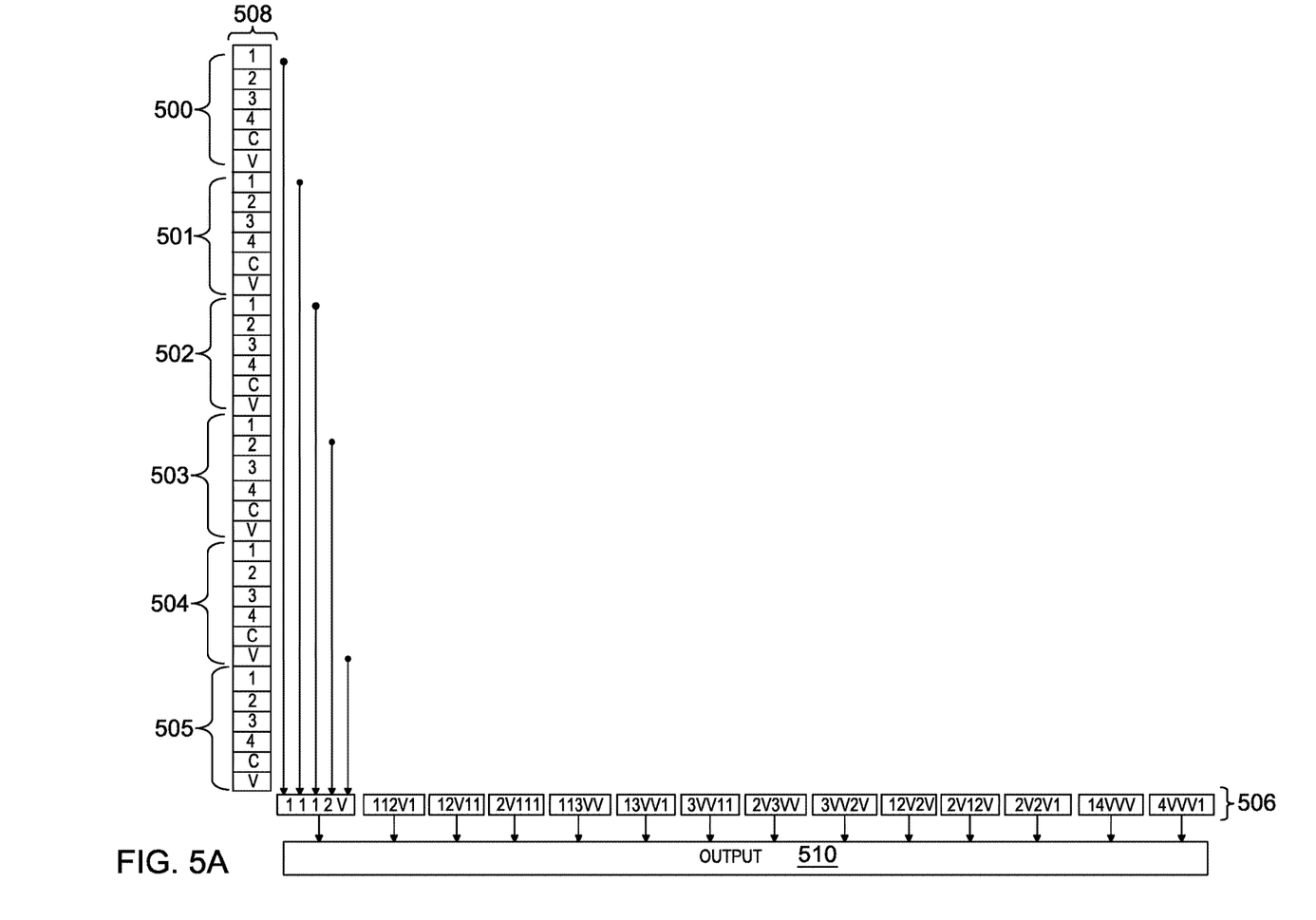
FIGS. 5A and 5B depict examples of the optimization of data patterns to support during UTF conversion.
Figure 5B:
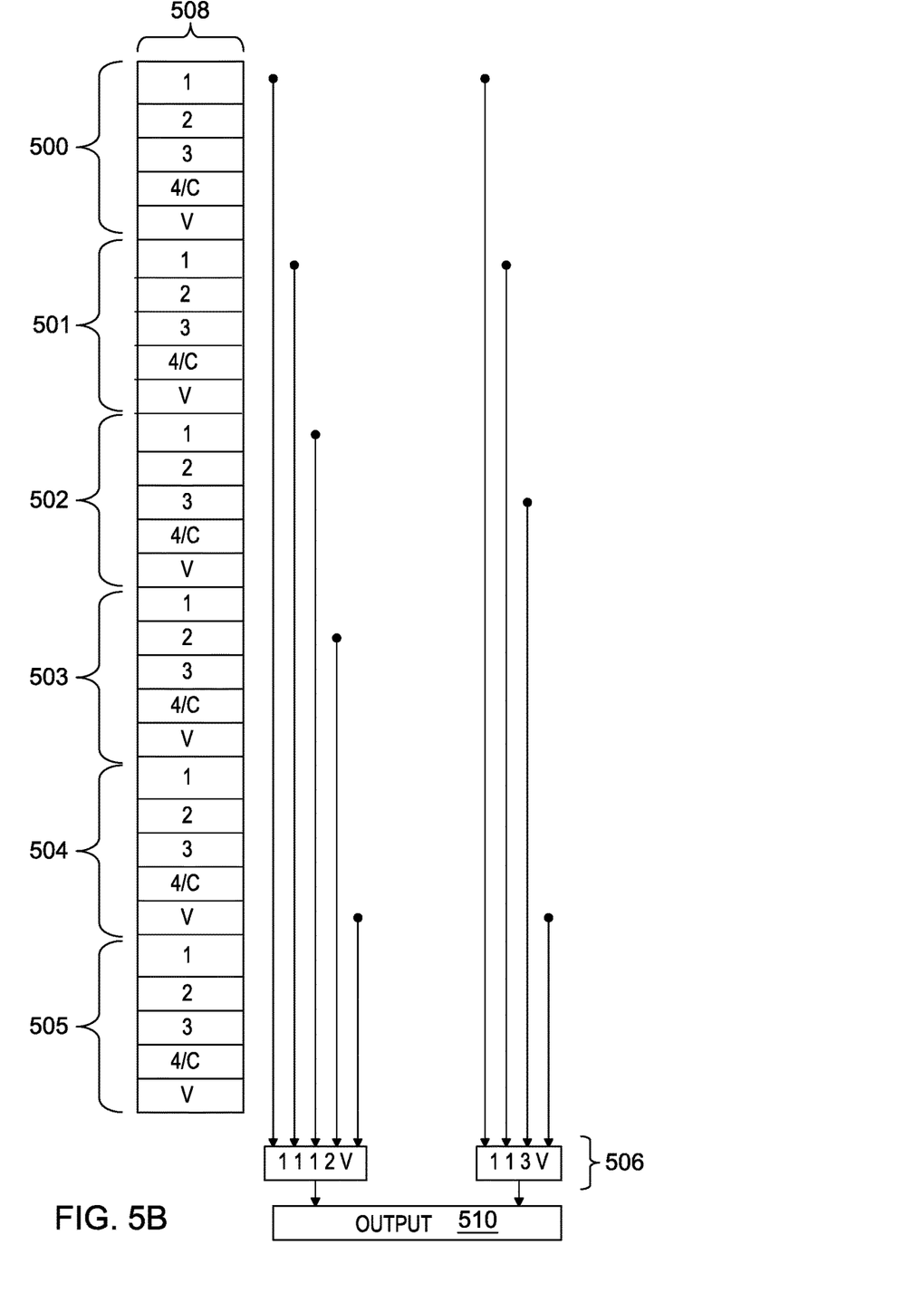

FIGS. 5A and 5B depict examples of the optimization of data patterns to support during UTF conversion.

In FIG. 5A, an example of data patterns 506 that need to be supported during conversion from UTF-8 to UTF-16 before optimization is depicted, when shifting out at five bytes at one time. As depicted in FIG. 5A, the number of data patterns 506 that must be supported during conversion from UTF-8 to UTF-16 when shifting out at five bytes is 14. Byte queue 508 includes one-hot info bits (i.e., 1, 2, 3, 4, C, V) associated with each of bytes 500-505. Each of the 14 data patterns 506 of FIG. 5A is stored as a number of logical operations on the one-hot info bits associated with each of bytes 500-505 in byte queue 508. As data patterns 506 are orthogonal, a simple OR is sufficient to achieve output 510. An exemplary data pattern 506, pattern 1112V, is mapped to each byte 500-505 of the data pattern. As depicted in FIG. 5A, output 510 is the cumulative output for each data pattern 506 (14 in this example) that is converted, and uses a large amount of logic and area within converter engine 140.

In FIG. 5B, an example of data patterns 506 that need to be supported during conversion from UTF-8 to UTF-16 after optimization is depicted, when shifting out at five bytes at one time. As depicted in FIG. 5B, the number of data patterns 506 obtained from the statistical analysis of high frequency of occurrence data patterns is two for the UTF-8 to UTF-16 mode of conversion when shifting out at five bytes. Each of the two data patterns 506 are stored as a number of logical operations on one-hot info bits associated with each of bytes 500-505 in byte queue 508. As data patterns 506 are orthogonal, a simple OR is sufficient to achieve output 510. By only supporting two high frequency of occurrence patterns, compared to the 14 patterns that need to be supported in FIG. 5A, the amount of area and logic used during conversion within converter engine 140 is reduced.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a plurality of byte sequence patterns, wherein the plurality of byte sequence patterns represents data in a first code format;
   receiving, by a coprocessor, a source input as millicode, wherein the millicode fetches a first set of source data from a main memory of a processor and inputs the first set of source data into an input buffer via writing to a register, wherein the first set of source data is in the first code format having a plurality of input data patterns;
   reading, by the coprocessor, the first set of source data in the first code format into a queue;
   identifying, by the coprocessor, a first set of data patterns among the first set of source data in the first code format that have an occurrence frequency greater than or equal to a predetermined threshold; and
   converting the identified first set of the source data in the first code format to a second code format that requires less storage than the first code format in one conversion cycle by selecting a frequently occurring data pattern with the occurrence frequency greater than or equal to the predetermined threshold, and coding hardware logic of a converter engine to convert the selected frequently occurring data pattern into the second code format.

2. The method of claim 1, comprising:
   identifying, by the coprocessor, a second set of data patterns among the first set of source data in the first code format that have an occurrence frequency that is less than a predetermined threshold that indicates a low likelihood of occurrence; and
   converting, by the coprocessor, the identified second set of data patterns among the first set of source data in the first code format to a second code format in one or more conversion cycles.

3. The method of claim 1, wherein the step of determining a plurality of byte sequence patterns comprises:
   determining a first plurality of byte sequence patterns associated with a high likelihood of occurrence; and
   determining a second plurality of byte sequence patterns associated with a low likelihood of occurrence, wherein the second plurality of byte sequence patterns can be broken into smaller patterns which match one or more of the first plurality of byte sequence patterns.

4. The method of claim 1, wherein the step of determining a plurality of byte sequence patterns, wherein the plurality of byte sequence patterns represent data in a first code format occurs prior to receiving the first set of source data in the first code format.

5. The method of claim 1, wherein the plurality of byte sequence patterns are determined using a set of parameters comprising at least two modes of conversion and at least one signal.

6. The method of claim 3, wherein:
   the first plurality of byte sequence patterns associated with a high likelihood of occurrence are converted in one conversion cycle; and
   the second plurality of byte sequence patterns associated with a low likelihood of occurrence are converted in at least one conversion cycle.

7. The method of claim 1, wherein the queue is a tool for the input buffer to read in source data, and wherein the queue is configured to hold at least one byte of source data.

8. The method of claim 1 comprising:
   storing, by a coprocessor, a determined nature and a determined validity of the first set of data in the first code format.

9. A coprocessor comprising:
   an input buffer comprising a register configured to temporarily store millicode;
   a converter engine, wherein a set of hardware logic of the converter engine contains a statistical analysis of input data pattern frequency showing a set of data patterns with a high likelihood of occurrence and a set of data patterns with a low likelihood of occurrence; and
   the coprocessor is configured to:
   receive source input as millicode, and the millicode fetches source data in a first code format from a main memory of a processor and inputs the source data into the input buffer by writing to the register;
   decode the source input to determine a nature of the source input, wherein a bit sequence of a first byte of the source input indicates the nature of the source input as having an input data pattern of one, two, three or four bytes in length;
   temporarily store the bit sequence of the first byte of the source input as one-hot info bits to internal latches of the converter engine;
   read the source data in the first code format into a queue, wherein said queue is loaded with the temporarily stored one-hot info bits and the source data;
   identify a first set of the source data in the first code format that indicates a high likelihood of occurrence based on the statistical analysis of input data pattern frequency;
   select frequently occurring data patterns associated with the first set of source data; and
   convert the first set of the source data in the first code format to a second code format that requires less storage than the first code format in one conversion cycle by coding the set of hardware logic of the converter engine to convert the selected frequently occurring data patterns into the second code format.

10. The coprocessor of claim 9, wherein the coprocessor is configured to:
    identify a second set of the source data in the first code format that indicates a low likelihood of occurrence based on the statistical analysis of input data pattern frequency; and
    convert the identified second set of the source data in the first code format to a second code format in one or more conversion cycles.

11. The coprocessor of claim 9, wherein the first set of source data in the first code format comprises:
    a first plurality of byte sequence patterns associated with a high likelihood of occurrence; and
    a second plurality of byte sequence patterns associated with a low likelihood of occurrence, wherein the second plurality of byte sequence patterns are configured to be broken into smaller patterns which match one or more of the first plurality of byte sequence patterns.

12. The coprocessor of claim 11, wherein the first plurality of byte sequence patterns associated with a high likelihood of occurrence are configured to be converted in one conversion cycle; and the second plurality of byte sequence patterns associated with a low likelihood of occurrence are configured to be converted in at least one conversion cycle.

13. The coprocessor of claim 9, wherein the queue is a tool for the input buffer to read in source data, and wherein the queue is configured to hold at least one byte of source data.

14. The coprocessor of claim 9, wherein the coprocessor is configured to determine a number of symbols of the first set of source data in the first code format.

15. The coprocessor of claim 9, wherein the coprocessor is configured to store the determined nature and a determined validity of the first set of data in the first code format.

* * * * *